US006266577B1

United States Patent
Popp et al.

(10) Patent No.: US 6,266,577 B1
(45) Date of Patent: Jul. 24, 2001

(54) SYSTEM FOR DYNAMICALLY RECONFIGURE WIRELESS ROBOT NETWORK

(75) Inventors: Robert L. Popp, Norwell; David J. Montana, Arlington; Joseph B. Walters, Waltham, all of MA (US)

(73) Assignee: GTE Internetworking Incorporated, Cambridge, MA (US)

( * ) Notice: Subject to any disclaimer, the term of this patent is extended or adjusted under 35 U.S.C. 154(b) by 0 days.

(21) Appl. No.: 09/114,649

(22) Filed: Jul. 13, 1998

(51) Int. Cl.[7] .......................... G06F 19/00; G06F 15/18; G05B 19/418; G06E 1/00
(52) U.S. Cl. ...................... 700/248; 700/245; 700/248; 706/16; 706/25
(58) Field of Search .................................. 709/221, 201; 713/100; 706/12, 13, 16, 25; 700/245, 248

(56) References Cited

U.S. PATENT DOCUMENTS

| | | | |
|---|---|---|---|
| 4,788,637 | * 11/1988 | Tamaru | 709/221 |
| 4,956,772 | * 9/1990 | Neches | 709/300 |
| 4,998,050 | 3/1991 | Nishiyama | 318/568 |
| 5,084,826 | 1/1992 | Hariki et al. | 395/83 |
| 5,361,023 | * 11/1994 | Kim | 318/568.16 |
| 5,504,890 | * 4/1996 | Sanford | 707/3 |
| 5,719,761 | * 2/1998 | Gatti et al. | 364/130 |
| 5,787,262 | * 7/1998 | Shakib et al. | 709/205 |
| 5,819,008 | * 10/1998 | Asama et al. | 395/90 |
| 5,825,985 | * 10/1998 | Matsuda | 395/83 |
| 5,848,398 | * 12/1998 | Martin et al. | 705/14 |
| 5,907,491 | 5/1999 | Canada et al. | 364/468.15 |

FOREIGN PATENT DOCUMENTS

0279558A1 * 8/1988 (EP) .................................. G09B/5/14

OTHER PUBLICATIONS

Koza, John R., Evolution and Co–Evolution of Computer Programs to Control Independently–Acting Agents, European Conference on Artificial Life (ECAL'91), Paris, France, Dec. 1991.

Koza, John R. et al., Automatic Programming of a Time–Optimal Robot Controller and an Analog Electrical Circuit to Implement the Robot Controller by Means fo Genetic Programming, Proceedings of 1997 IEEE International Symposium on Computational Intelligence in Robotics and Automation, Computer Society Press, Los Alamitos, CA, 1997.

Floreano, D. et al., Evolution of Homing Navigation in a Real Mobile Robot, IEEE Transactions on Systems, Man, and Cybernetics–Part B, Cybernetics, vol. 26, No. 3, Jun. 1996.

Floreano, D. et al., Evolution and Learning in Autonomous Robots, in Bio–Inspired Computing Systems, in Mange, D., and Tomassini, M. (eds), PPUR, Lausanne, 1998.

(List continued on next page.)

Primary Examiner—Thomas Lee
Assistant Examiner—Chun Cao
(74) Attorney, Agent, or Firm—Leonard Charles Suchyta

(57) ABSTRACT

Methods and systems consistent with the invention provide a robot network that can optimally reconfigure the control logic on-board each robot of the network on a real-time basis. Each robot of the network performs an assigned task according to a control logic. While performing the assigned task, each robot transmits performance data defining a fitness level of the robot for achieving the assigned task. A set of the plurality of robots is then selected based on the performance data transmitted by each robot, and the control logic of the selected set of robots is then sent to the other robots in the network. The robots that receive the control logic then optimize their control logic by producing a new control logic based on the received control logic.

29 Claims, 3 Drawing Sheets

OTHER PUBLICATIONS

Mondada, F. et al., Evolution and Mobile Autonomous Robotics, in E. Sanchez and M. Tomassini (eds), Towards Evolvable Hardware: The Evolutionary Engineering Approach, vol. 1062 of LNCS, pp. 221–249, Springer–Verlag, 1996.

Nolfi, S et al., How to Evolve Autonomous Robots: Different Approaches in Evolutionary Robotics, Proceedings of the Fourth Workshop on Artificial Life, Boston, Ma, 1994.

Thompson, A., Evolving Electronic Robot Controllers the Exploit Hardware Resources, Submitted to Third European Conference on Artificial Life (ECAL'95).

Inman, Harvey et al., Issues in Evolutionary Robotics, in Meyer, J–A., Roitblat, H.L., and Wilson, S.W. (eds) From Animals to Animats 2, Proceedings of the Second International Conference on Simulation of Adaptive Behavior, pp. 364–373, MIT, 1993.

Reynolds, Craig W., An Evolved, Vision–Based Behavioral Model of Coordinatd Group Motion, in Meyer, J–A., Rotiblat, H.L., and Wilson, S.W. (eds) From Animals to Animats 2, Proceedings of the Second International Conference on Stimulation of Adaptive Behavior, pp. 384–392, MIT, 1993.

Mataric, Maja J., Designing Emergent Behaviors: From Local Interactions to Collective Intelligence, in Meyer, J–A., Roitblat, H.L., and Wilson, S.W. (eds) From Animals to Animats 2, Proceedings of the Second International Conference on Simulation of Adaptive Behavior, pp. 432–441, MIT, 1993.

Floreano, D., Evolutionary Robotics in Behavior Engineering and Artificial Life in Proc. of the 6th Intl. Symposium Evolutionary Robotics "98 (ER'98), from Intelligent Robotics to Artificial Life, Tokyo, Japan, Apr. 8–9, 1998 (Copy Unavailable).

Jakobi, N. The Minimal Simulation Approach to Evolutionary Robotics, in Proc. of the 6th Intl. Symposium Evolutionary Robotics '98 (ER'98) from Intelligent Robotics to Artificial Life, Tokyo, Japan, Apr. 8–9, 1998. (Copy Unavailable).

Husbands, P. et al., A Case Study in Evolutionary Robotics in Back, T., Fogel, D., and Michalewicz, Z. (eds) Handbook of Evolutionary Computation, Oxford University Press, 1997. (Copy Unavailable).

* cited by examiner

SYSTEM FOR DYNAMICALLY RECONFIGURE WIRELESS ROBOT NETWORK

BACKGROUND OF THE INVENTION

A. Field of the Invention

The present invention relates to robot networks, and, more particularly, to methods and systems for reconfiguring robots of a network.

B. Description of the Related Art

In recent years, robot networks have become more popular and their assigned tasks have become more sophisticated. Typically, robot networks include a plurality of robots that operate according to an on-board control logic. The control logic acts as the "brains" of each robot and defines the action of the robot in response to a sensed input from the environment. For instance, the control logic may define how the robot processes an input data signal or moves in response to a sensed environmental condition. Thus, the performance of the overall robot network is necessarily a function of the accuracy of the control logic.

The article "Issues in Evolutionary Robotics," Harvey et al., Proceedings of the Second International Conference on Simulation of Adaptive Behavior, (1993), describes a method for reconfiguring the control logic of each robot in a network. Under this approach, each robot is initially downloaded with a different control logic. Thus, the robots of the robot network will each perform the assigned task with a varying degree of success. To improve the performance of those robots that are less successful, a new control logic is determined "off-line." In particular, genetic programming techniques are used to reconfigure the control logic of the more successful robots to produce a new control logic for the less successful robots. These genetic programming techniques, which include mutation and cross-over techniques, are well known in the art and are used to produce an evolved control logic by reconfiguring the control logic of the more successful robots. After this new control logic is downloaded onto the less successful robots, the robots are then placed back into operation to accomplish an actual task.

A problem with the above approach, however, is that the robots cannot reconfigure their control logic dynamically while performing their assigned task. The new control logic must be determined "off-line." Nor does this approach allow the robots to reconfigure their control logic using data detected while performing an actual task at hand. In the above approach, the new control logic is determined "off-line" using a predefined set of environmental conditions.

Other robot networks include robots that share information with one another. Thus, data detected by one robot may be shared with the other robots of the network to help those other robots achieve a commonly assigned task. However, these approaches also fail to allow the robots to dynamically reconfigure their control logic. In other words, these networks merely allow robots to share information, but do not allow the robots to change how they process that information.

Therefore, there is a need for a robot network that allows the individual robots to optimally reconfigure their on-board control logic on a real-time basis.

SUMMARY OF THE INVENTION

Systems consistent with the present invention allow robot networks to optimally reconfigure the control logic on-board each robot of the network on a real-time basis.

To achieve these and other advantages, a robot network consistent with the present invention comprises a plurality of robots. Each robot performs an assigned task according to a control logic. To reconfigure the control logic, each robot transmits performance data indicating a fitness level of that robot associated with the assigned task. A subset of the robots is then selected based on the performance data transmitted by each robot. The control logic of the selected subset of robots is then transmitted to other robots of the network. Finally, the control logic of each robot receiving the control logic is reconfigured by producing a new control logic based on the received control logic.

Another aspect of the invention comprises a robot performing an assigned task according to a first control logic. The robot includes a transmitter which transmits performance data indicating a fitness level of the robot associated with the assigned task and a receiver which receives a second control logic determined based on the performance data transmitted by the robot. The robot further includes a processor which optimizes the first control logic of the robot by producing an optimized control logic based on the received second control logic.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

A. Introduction

Robot networks consistent with the present invention can optimally reconfigure the control logic on-board each robot of the network on a real-time basis. The network periodically evaluates status information defining the performance of each robot in achieving its assigned task. By evaluating the status information of each of the robots, the network determines which robots are best performing the assigned task (i.e., those robots that are "most fit"). The control logic of the "most fit" robots are then transmitted to "less fit" robots.

The "less fit" robots then use genetic programming techniques to produce a new control logic from the control logic of the "most fit" robots. After producing the new control logic using the genetic programming techniques, each "less fit" robot reconfigures its control logic by replacing it with the new control logic. This process is repeated each time the network evaluates the status information of the robots. In this way, the robots of the robot network can dynamically reconfigure their control logic on a real time basis.

B. System Organization

Figure 1:
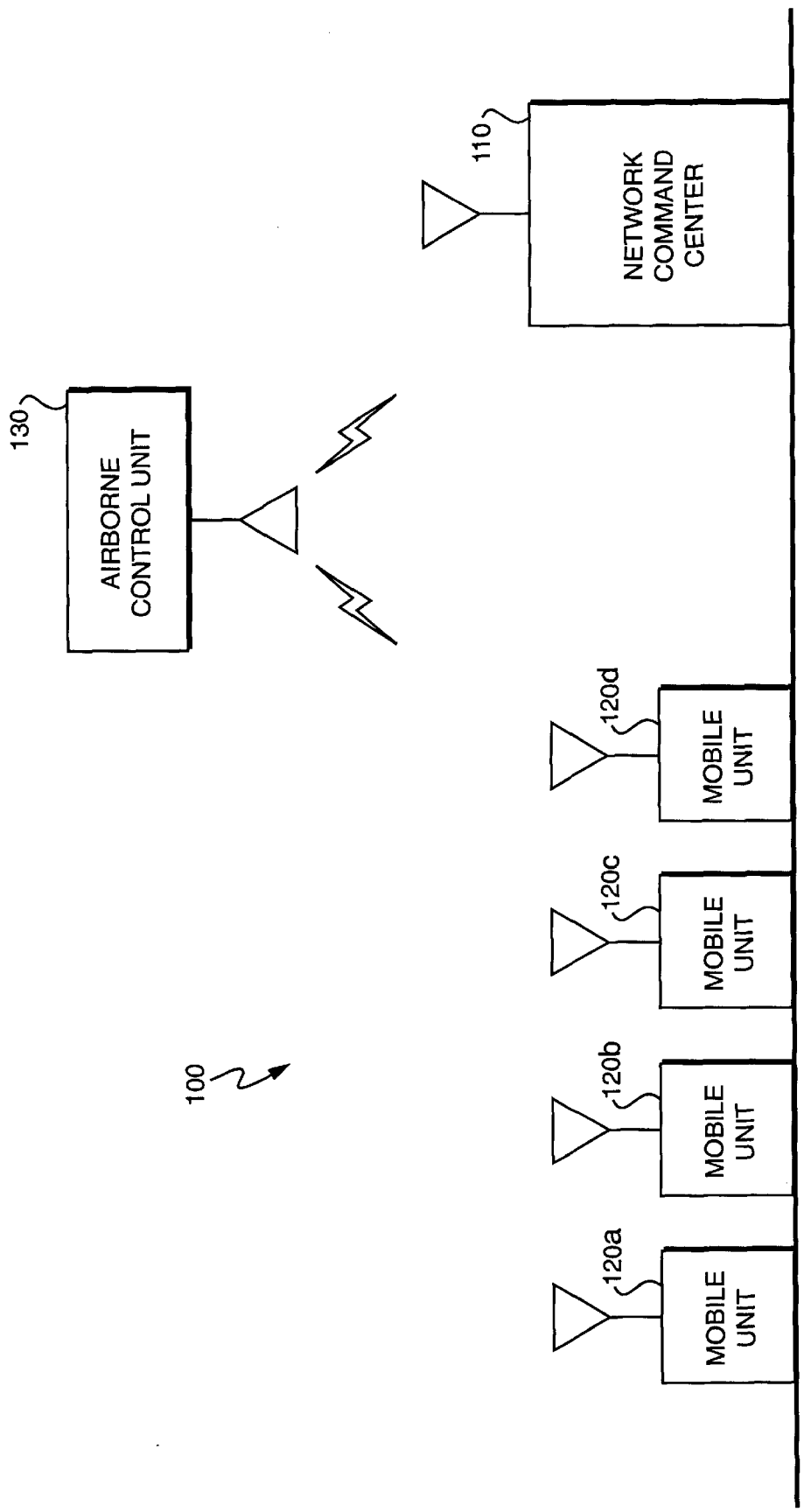
FIG. 1 is a diagram illustrating a robot network consistent with the present invention.

FIG. 1 is a diagram illustrating a robot network 100 consistent with the present invention. As shown in FIG. 1, robot network 100 includes a network command center (NCC) 110, a plurality of robots 120-*a* to 120-*d*, and an airborne control unit 130. NCC 110 and robots 120 are each located on the ground, while airborne control unit 130 is located in the air. While FIG. 1 shows four robots 120-*a* to 120-*d*, robot network 100 may include any number of robots.

Robots 120 are pre-programmed to achieve an assigned task using a known search strategy, such as clustering, spreading, positioning, enveloping, or corroborating. While robots 120 perform their assigned tasks, each robot 120 preferably transmits status information to NCC 110. The status information includes data defining the position of each robot 120 and data defining the performance of each robot 120 in completing its assigned task. Upon receiving the status information, NCC 110 transmits command information to robots 120 requesting a robot 120 to either move to a new position, modify its assigned task, or reconfigure its motion control logic or signal processing control logic. NCC 110 and robots 120 communicate with one another through airborne control unit 130. Airborne control unit 130 includes communication circuitry, such as radio frequency (RF) components, to allow robots 120, each equipped with a low power transmitter, to communicate with NCC 110 over a long distance. NCC 110 controls the movement of airborne control unit 130 such that unit 130 is in a position that maximizes or ensures communication between NCC 110 and robots 120. While control unit 130 is preferably an airborne unit, as shown in FIG. 1, control unit 130 may also be either a mobile or fixed ground based unit. Further, alternative embodiments of robot network 100 may not include airborne control unit 130 when robots 120 and NCC 110 can adequately communicate with one another without an intermediate relay station.

Figure 2:
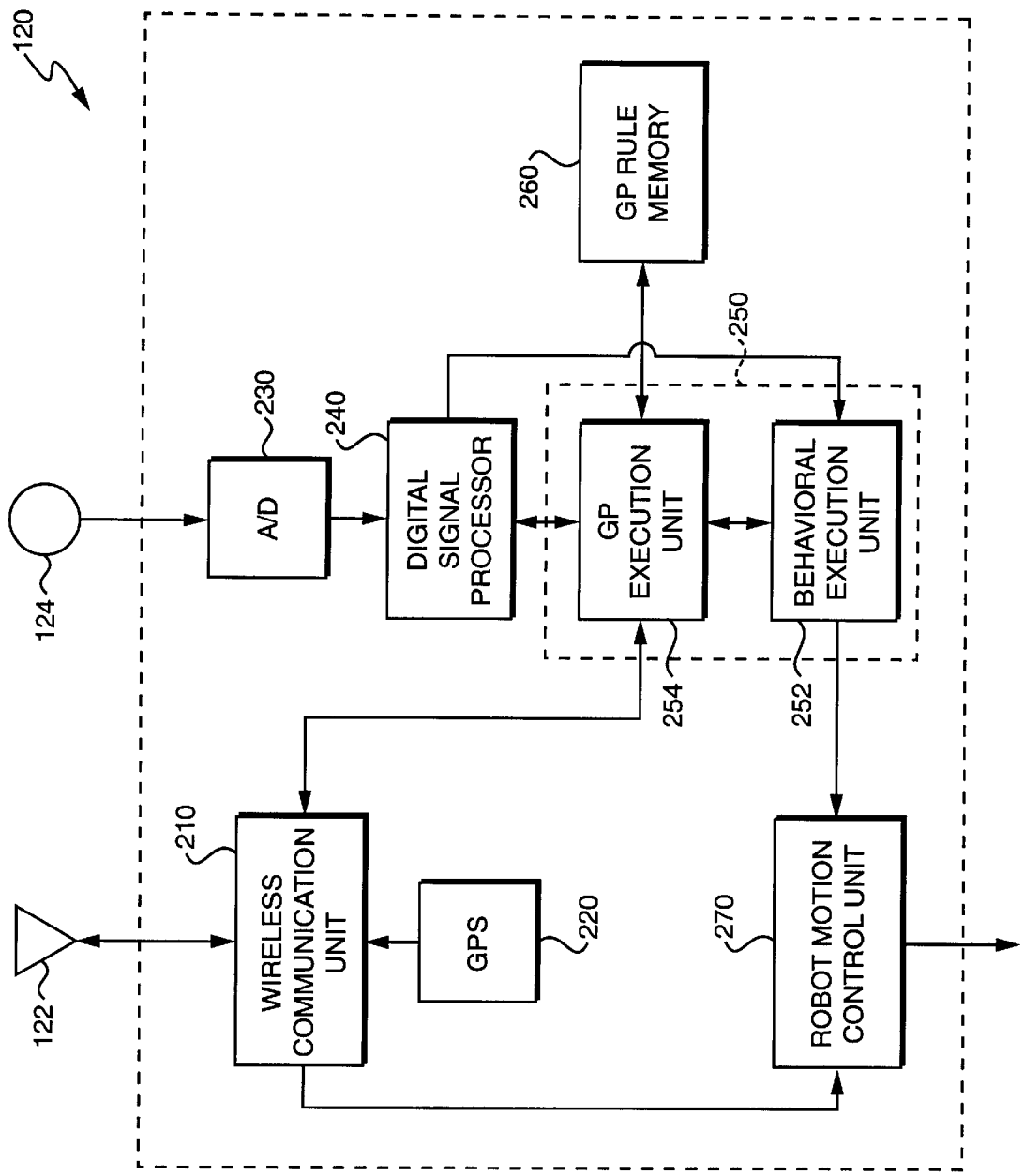
FIG. 2 is a block diagram of a robot consistent with the present invention for use in the network of FIG. 1.

FIG. 2 is a block diagram of a robot 120 consistent with the present invention. As shown in FIG. 2, robot 120 includes a wireless communication unit 210, a global positioning system (GPS) 220, an analog-to-digital (A/D) converter 230, a digital signal processor (DSP) 240, a computer processor 250, a genetic programming (GP) rule memory 260, and a motion control unit 270. Robot 120 transmits and receives data through an antenna 122 and receives input data through a sensor 124.

Wireless communication unit 210, which may be a standard RF communication module, transmits the status information and receives the command information through antenna 122, as described above in reference to FIG. 1. Communication unit 210 also receives position data from GPS 220 for transmission to NCC 110 as part of the status information.

Sensor 124 detects data from the environment of robot 120 and transfers the detected data to DSP 240, via A/D 230. Sensor 124 may be, for example, a seismic shock wave sensor, a vibration sensor, a magnetic sensor, an acoustic sensor, a chemical sensor, or a camera. While FIG. 2 shows only one sensor 124, systems consistent with the invention may include robots 120 having multiple sensors. After A/D 230 converts the analog output data of sensor 124 into digital data, DSP 240 processes the digital data using a signal processing control logic known to those skilled in the art, such as a standard adaptive filtering algorithm.

Computer processor 250 further includes a behavioral execution unit 252 and a GP execution unit 254. Behavioral execution unit 252 receives processed data output from DSP 240 and generates a motion control signal. Behavioral execution unit 252 generates the motion control signal according to a stored motion control logic. The motion control logic defines a particular motion of robot 120 according to the output of DSP 240. For example, if the output of DSP 240 indicates that the signal magnitude of sensor 124 is becoming increasingly smaller as robot 120 moves in a particular direction, the motion control logic may determine that robot 120 should move in another direction.

Behavioral execution unit 252 outputs the generated motion control signal to motion control unit 270, to cause robot 120 to move. Motion control unit 270 also controls movement of robot 120 based on command information received, from NCC 110 through communication unit 210, requesting robot 120 to move. Motion control unit 270 is preferably a servo-motor control unit that controls the motors (not shown) responsible for moving robot 120. Motors controlled by motion control unit 270 may be for moving robot 120 to a new position or for moving a device, such as a robotic arm, on robot 120.

GP execution unit 254 receives command information from NCC 110, via communication unit 210, requesting GP execution unit 254 to reconfigure either the signal processing control logic of DSP 240 or the motion control logic of behavioral execution unit 252. GP execution unit 254 preferably reconfigures the signal processing control logic or the motion control logic using standard GP techniques executed in accordance with rules stored in GP rule memory 260. In particular, GP execution unit 254 produces a new control logic in an attempt to optimize the control logic on-board robot 120. GP processing techniques executed by GP execution unit 254 and GP rules of GP rule memory 260 may be those disclosed in "Genetic Programming", John R. Koza, MIT Press, Cambridge, Mass., (1992), the subject matter of which is hereby incorporated by reference.

C. Method Process

Figure 3:
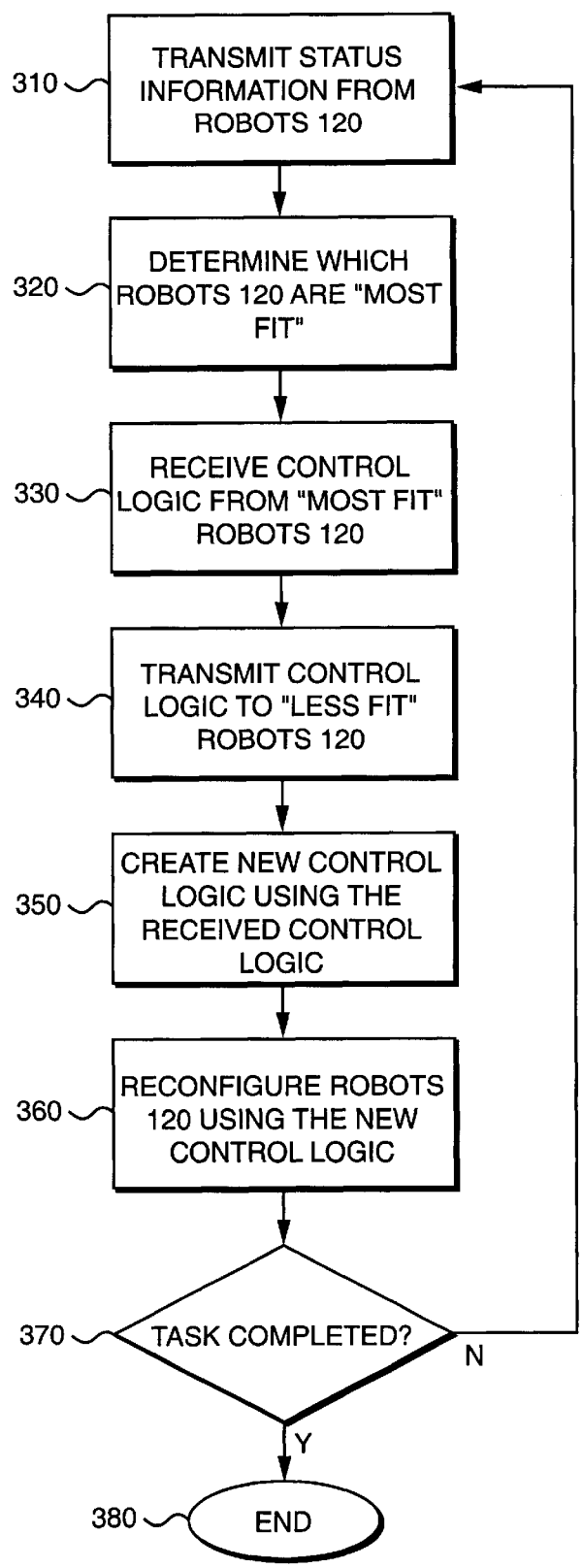
FIG. 3 flow diagram of a method consistent with the present invention for reconfiguring robots of the robot network of FIG. 1.

FIG. 3 is a flow diagram of a method consistent with the present invention for reconfiguring robots 120 of robot network 100. The method for reconfiguring robots 120 assumes that robots 120 have been synchronized with each other and that each robot 120 has been registered with network 100.

As shown in FIG. 3, the method begins with each robot 120 transmitting status information to NCC 110 (step 310). As described above, the status information includes performance data defining the robot's performance in completing its assigned task. While not necessary for reconfiguring robot 120, the status information may also include position data defining the position of robot 120. In such a case, the transmitted position data corresponds to the position data output from GPS 220 on-board each robot 120.

In systems consistent with the invention, the performance data is based on selected criteria and provides a quantitative basis for indicating the performance or fitness of robot 120. For example, DSP 240 may output performance data based on the signal strength of the signal output by sensor 124 or based on the output of sensor 124 relative to its output at a previous time. NCC 110 evaluates the performance data received from each robot 120 and determines which robot 120 is the "most fit" or performing best based on the selected criteria (step 320). In particular, NCC 110 ranks robots 120 by their respective transmitted performance data and selects those robots 120 that are above a certain threshold value as "most fit." The threshold value may be, for example, a fixed value or a percentage value.

NCC 110 then requests and receives either the signal processing control logic of DSP 240, the motion control logic of behavioral execution unit 252, or both, from each robot 120 that NCC 110 considers to be "most fit" (step 330).

NCC 110 then transmits to the "less fit" robots 120 the control logic received from the "most fit" robots 120. The "less fit" robots 120 of robot network 100 are simply those robots 120 not considered to be "most fit" (step 340).

Communication units 210 of the "less fit" robots 120 transfer the received control logic to GP execution unit 254. Using the rules stored in GP rule memory 260, GP execution unit 254 then processes the received control logic by standard GP techniques (step 350). In particular, GP execution unit 254 produces a new signal processing control logic or motion control logic by evolving the control logic of the "most fit" robots 120. GP execution unit 254 produces the new control logic in an attempt to optimize the control logic on-board robot 120.

GP execution unit 254 then reconfigures robots 120 by replacing either the signal processing control logic of DSP 240 with the new control logic or by replacing the motion control logic of behavioral execution unit 252 with the new control logic (step 360). In this way, GP execution unit 254 can reconfigure the signal processing control logic or the motion control logic into an optimized version that better performs the task assigned to robot 120.

Robots 120 of robot network 100 periodically reconfigure their on-board control logic until robots 120 have completed their assigned task (steps 370 and 380). For those robots 120 which have not completed their assigned task, processing returns to step 310 where those robots 120 transmit the status information to NCC 110. Robots 120 preferably transmit status information to NCC 110 on a periodic basis, the particular period being chosen according to the application.

In robot networks 100 consistent with the present invention, robots 120 may also reconfigure their on-board control logic by transmitting status information to the other robots 120 of network 100, as opposed to NCC 110 as described above.

In this case, each robot 120 includes a processor for performing the processing of NCC 110. In particular, each robot 120 receives status information from all the other robots 120 and determines which robots 120 are "most fit." Those robots 120 that are "most fit" then transmit their control logic to the "less fit" robots 120. Processing then proceeds as described above with respect to steps 350 to 380.

In addition, the method for reconfiguring robots 120 may eliminate step of transmitting the status information. In particular, each robot 120 may store a predefined threshold value to determine whether that robot 120 is "most fit." Thus, robot 120 first determines whether its performance data is above the predefined threshold value. If so, then robot 120 is "most fit" and will transmit its control logic to all the other robots 120 of robot network 100. If the performance data is not above the predefined threshold value, then robot 120 receives the control logic from the "most fit" robots 120 and processing proceeds as described above with respect to steps 350 to 380.

Further, the method for reconfiguring robots 120 may only be used to reconfigure a subset of robots 120 included in robot network 100. For example, robot network 100 may include a variety of types of robots 120. In such a case, only robots 120 of a common type are used to reconfigure robots 120 of that type by the method of FIG. 3.

D. Conclusion

Robot networks and methods consistent with the present invention can optimally reconfigure the control logic on-board each robot of the network on a real-time basis. It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A robot network having a plurality of robots, wherein each of the plurality of robots performs an assigned task according to a control logic, each robot of the network comprising:
   a wireless transmitter which transmits performance data indicating a fitness level of the robot associated with the assigned task;
   a wireless receiver which receives the control logic of a selected set of the plurality of robots while the robot continues to operate, the control logic being selected based on the performance data transmitted by each robot; and
   a processor which reconfigures the control logic of the robot by producing a new control logic based on the received control logic.

2. The network of claim 1, wherein the transmitter transmits position data defining the position of the robot.

3. The network of claim 1, further including:
   a sensor for detecting environmental data from the environment of the robot.

4. The network of claim 3, wherein the performance data transmitted by the transmitter corresponds to a signal strength of the sensor.

5. The network of claim 3, wherein the performance data transmitted by the transmitter corresponds to a first output of the sensor obtained at a first time relative to a second output of the sensor obtained at a second time.

6. The network of claim 3, wherein the control logic is a motion control logic that defines a motion of the robot in response to the detected environmental data.

7. The network of claim 3, wherein the control logic is a signal processing control logic that processes the detected environmental data.

8. The network of claim 1, wherein the network further includes:
   a network command center, and wherein the transmitter transmits the performance data to the network command center, and wherein the network command center selects the selected set of the plurality of robots using the transmitted performance data.

9. The network of claim 1, wherein the transmitter transmits the performance data to each of the other robots of the plurality of robots, wherein each robot selects the selected set of the plurality of robots using the transmitted performance data.

10. The network of claim 1, wherein the transmitter transmits the performance data every preset period of time.

11. The network of claim 10, wherein the processor reconfigures the control logic during each preset period of time.

12. The network of claim 1, wherein the processor further includes:
   a genetic programming execution unit which reconfigures the control logic using genetic programming techniques executed in accordance with a predefined set of genetic programming rules.

13. The network of claim 1, wherein the processor replaces the control logic of the robot with the new control logic.

14. A method for reconfiguring a network of robots, each robot performing an assigned task according to a control logic, the method comprising the steps of:

wirelessly transmitting performance data indicating a fitness level of each robot associated with the assigned task;

selecting a subset of the robots based on the performance data transmitted by each robot;

wirelessly transmitting the control logic of the selected subset of robots to other robots of the network while the other robots of the network continue to operate; and reconfiguring the control logic of each robot receiving the control logic by producing a new control logic based on the received control logic.

15. The method of claim 14, wherein the step of transmitting performance data further includes the substep of:

transmitting position data defining the position of the robot.

16. The method of claim 14, further including the step of:

detecting environmental data from the environment of the robot.

17. The method of claim 16, wherein the step of transmitting performance data further includes the substep of:

transmitting performance data corresponding to a signal strength of the detected environmental data.

18. The method of claim 16, wherein the step of transmitting performance data further includes the substep of:

transmitting performance data corresponding to the environmental data detected at a first time relative to the environmental data detected at a second time.

19. The method of claim 16, wherein the control logic is a motion control logic that defines a motion of the robot in response to the detected environmental data.

20. The method of claim 16, wherein the control logic is a signal processing control logic that processes the detected environmental data.

21. The method of claim 14, wherein the network further includes a network command center, and wherein the step of transmitting performance data further includes the substep of:

transmitting the performance data to the network command center.

22. The method of claim 14, wherein the step of transmitting performance data further includes the substep of:

transmitting the performance data to each of the other robots of the network.

23. The method of claim 14, wherein the step of transmitting performance data further includes the substep of:

transmitting the performance data every preset period of time.

24. The method of claim 23, wherein the reconfiguring step further includes the substep of:

reconfiguring the control logic during each preset period of time.

25. The method of claim 14, wherein the reconfiguring step further includes the substep of:

reconfiguring the control logic using genetic programming techniques executed in accordance with a predefined set of genetic programming rules.

26. The method of claim 14, wherein the reconfiguring step further includes the substep of:

replacing the control logic of the robot with the new control logic.

27. A robot performing an assigned task according to a first control logic, the robot comprising:

a wireless transmitter which transmits performance data indicating a fitness level of the robot associated with the assigned task;

a wireless receiver which receives a second control logic determined based on the performance data transmitted by the robot while the robot continues to operate; and a processor which reconfigures the first control logic of the robot by producing an reconfigured control logic based on the received second control logic.

28. The network of claim 8, wherein the network further includes:

an airborne control unit forwarding data between the network command center and the robots of the network.

29. The method of claim 21, wherein an airborne control unit forwards data between the network command center and the robots of the network.

* * * * *